(12) United States Patent
Toebes (10) Patent No.: US 6,940,954 B1
(45) Date of Patent: Sep. 6, 2005

(54) ARRANGEMENT FOR RETRIEVING RECORDED AUDIO ANNOUNCEMENTS FROM A MESSAGING SYSTEM FOR IDENTIFICATION OF A CALLING PARTY

(75) Inventor: John Albert Toebes, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 62 days.

(21) Appl. No.: 10/235,724

(22) Filed: Sep. 6, 2002

(51) Int. Cl.[7] .............................................. H04M 1/64
(52) U.S. Cl. ............................... 379/88.17; 379/88.21; 379/142.06; 379/207.15; 379/373.04; 455/415; 709/219
(58) Field of Search .......................... 379/88.11, 88.12, 379/88.17, 88.19, 142.06, 207.15, 373.04, 379/88.21, 88.2, 142.01, 142.04, 373.01; 455/415; 709/219

(56) References Cited

U.S. PATENT DOCUMENTS

| | | | |
|---|---|---|---|
| 4,899,358 A | 2/1990 | Blakley | |
| 5,764,747 A | 6/1998 | Yue et al. | |
| 5,940,484 A * | 8/1999 | DeFazio et al. | 379/142.06 |
| 5,974,128 A * | 10/1999 | Urban et al. | 379/221.09 |
| 5,999,599 A | 12/1999 | Shaffer et al. | |
| 6,108,630 A | 8/2000 | Kuechler et al. | |
| 6,233,325 B1 | 5/2001 | Frech et al. | |
| 6,282,269 B1 * | 8/2001 | Bowater et al. | 379/88.17 |
| 6,292,479 B1 * | 9/2001 | Bartholomew et al. | 370/352 |
| 6,570,983 B1 | 5/2003 | Speeney et al. | 379/373.02 |
| 6,650,740 B1 * | 11/2003 | Adamczyk et al. | 379/88.22 |
| 6,748,426 B1 * | 6/2004 | Shaffer et al. | 709/219 |
| 6,782,086 B2 * | 8/2004 | Clapper | 379/142.06 |

* cited by examiner

Primary Examiner—Fan Tsang
Assistant Examiner—Simon P. Sing
(74) Attorney, Agent, or Firm—Leon R. Turkevich (57) ABSTRACT

An IP-based subscriber endpoint, for example a VoIP telephony device or an IP telephony user agent, is configured for retrieving recorded audio caller information in response to receiving an incoming call that includes a calling party identifier. The IP-based subscriber endpoint, in response to receiving the calling party identifier, generates an IP-based query via an IP network to an identifiable server for identification of a source of the recorded audio caller information corresponding to the calling party identifier. The IP-based subscriber endpoint outputs a request to the source of the recorded audio caller information, and plays the recorded audio caller information in response to reception via the IP-based network. Hence, the IP-based subscriber endpoint is able to retrieve existing recorded audio caller information from servers configured for storing recorded names, eliminating the necessity for text to speech resources.

40 Claims, 3 Drawing Sheets

ARRANGEMENT FOR RETRIEVING RECORDED AUDIO ANNOUNCEMENTS FROM A MESSAGING SYSTEM FOR IDENTIFICATION OF A CALLING PARTY

BACKGROUND OF THE INVENTION

1. Field of the Invention

The present invention relates to network enabled telephony devices, for example Voice over IP Telephones, configured for providing voice messaging applications including identifying a calling party.

2. Description of the Related Art

Telephony devices have advanced to provide enhanced features for business consumers. For example, a business premises deploying a Private Branch Exchange (PBX) for intraoffice or interoffice communications utilizes telephony devices capable of receiving messages from the PBX, including a time of day string or a calling party identity string. However, proprietary PBX systems limit the availability of features that can be added to the telephony device. In addition, proprietary PBX systems typically provide voice-only services, such that text, data, or images cannot be transferred to the telephony device.

Voice over IP (VoIP) technology has evolved to provide network enabled telephony devices, for example Voice over IP telephony devices, configured for performing multiple operations that emulate a telephony device. VoIP telephony devices often include large display screens or other display capabilities, enabling new service features to be provided for a user. For example, the VoIP telephones, such as the commercially-available Cisco Telecaster 7960 IP Telephone from Cisco Systems, San Jose, Calif., includes user input and display operations. These user input and display operations enable a user to access multiple windows displaying respective applications based on soft key or hard key inputs, such as accessing a central telephone directory for retrieval of an employee's telephone number using a search query or selection from the displayed list. A user of the VoIP telephone can access one window configured displaying call status (e.g., duration of call, calling party identity), or access another window configured for displaying the central telephone directory.

Existing telephony systems, including private branch exchange systems, residential services, and VoIP systems, provide automatic number identification (ANI) signaling information that is decoded for display on the called party's telephone or associated ANI display device. These systems, however, require that a called party subscriber visually examine the display to identify the calling party: such systems are disadvantageous for visually-impaired subscribers or those that must interrupt their activities to view the display to determine whether to accept an incoming call. In addition, wireless telephones having displays are impractical for subscribers unable to divert their attention to the display, for example while operating a vehicle or performing some other manual task. Hence, subscribers often will ignore the display device altogether due to the substantial inconvenience.

Newer telephony systems, for example wireless digital PCS systems, enable a digital PCS subscriber to program his or her PCS phone to generate a distinctive ring based on the received ANI during an incoming call. In particular, the digital PCS subscriber needs to program his or her PCS phone to recognize input telephone numbers; the digital PCS subscriber then assigns to each input telephone number a corresponding selected ring from a group of available rings. This arrangement, however, requires the digital PCS subscriber to program the PCS phone to recognize the input telephone numbers, resulting in added inconvenience for the digital PCS subscriber. Moreover, this arrangement is ineffective for incoming calls having ANI values that do not match the input telephone numbers stored in the PCS phone, or if the incoming call is from a subscriber that uses a different service provider. Finally, this arrangement is useless if the subscriber needs to receive a call on an unprogrammed telephone, or if another user that does not recognize the distinctive tones borrows the subscriber's telephone.

U.S. Pat. No. 5,999,599 to Schaffer et al. discloses an arrangement where a calling party records his or her audio identifier (e.g., name) prior to making a telephone call; the recorded identification is then sent with each call the caller makes by inserting the recorded audio identifier within a new field of an SS7 signaling message. The recorded identification would then be played by the destination telephony device for announcement to the called party. Such an arrangement, however, imposes substantial bandwidth burdens on signaling networks; further, such an arrangement may be subject to abuse by anonymous callers that can record threatening messages on telephony devices that are available without subscriber identification or authorization, for example public telephones.

Other proposals for utilizing text to speech resources for generating audible forms of the ANI string, for example as disclosed in U.S. Pat. No. 6,233,325 to Frech et al. or U.S. Pat. No. 4,899,358 to Blakley, suffer from the disadvantage that substantial processing resources are expended in converting ANI strings into audible format.

SUMMARY OF THE INVENTION

There is a need for an arrangement that enables automatic audio caller identification to be implemented in a manner that eliminates the necessity of text to speech resources.

There also is a need for an arrangement that enables automatic audio caller identification to be implemented in a manner that promotes accurate identification of calling parties.

There also is a need for an arrangement that eliminates the necessity of storing recorded calling party names in telephony devices in a telephony network deployed within a premises (e.g., a business premises).

There also is a need for an arrangement that enables recorded audio caller identification information to be shared between private telephony networks.

These and other needs are attained by the present invention, where an IP-based subscriber endpoint, for example a VoIP telephony device or an IP telephony user agent, is configured for retrieving recorded audio caller information in response to receiving an incoming call that includes a calling party identifier. The IP-based subscriber endpoint, in response to receiving the calling party identifier, generates an IP-based query via an IP network to an identifiable server for identification of a source of the recorded audio caller information corresponding to the calling party identifier. The IP-based subscriber endpoint outputs a request to the source of the recorded audio caller information, and plays the recorded audio caller information in response to reception via the IP-based network. Hence, the IP-based subscriber endpoint is able to retrieve existing recorded audio caller information from servers configured for storing recorded names, for example from IP-based voice mail systems having subscribers record their names during registration for default greetings, eliminating the necessity for text to speech resources. Moreover, the IP-based retrieval of recorded audio caller information can be scaled across multiple enterprise networks based on secure sharing of subscriber information, enabling wide scale deployment of caller announcement with minimal hardware modification to existing Voice over IP networks.

One aspect of the present invention provides a method in an Internet Protocol (IP) based subscriber endpoint configured for receiving a telephony call for a called party and that includes a calling party identifier for identifying a corresponding calling party. The method includes outputting an IP-based query, that includes the calling party identifier, to a directory server for subscriber information that identifies the calling party. The method also includes determining a stored location of a recorded audio announcement that audibly identifies the calling party based on the subscriber information, retrieving via an IP connection the recorded audio announcement from the stored location, and outputting the recorded audio announcement as an announcement of the telephony call for the called party.

Another aspect of the present invention provides an Internet Protocol (IP) based subscriber endpoint device. The device includes an IP based interface configured for receiving a telephony call for a called party and that includes a calling party identifier for identifying a corresponding calling party. The device also includes a query resource configured for outputting an IP-based query, that includes the calling party identifier, to a directory server for subscriber information that identifies a calling party. The device also includes a file transfer resource configured for retrieving via an IP connection a recorded audio announcement, that audibly identifies the calling party, from a stored location determined based on the subscriber information, and an output resource configured for outputting the recorded audio announcement as an announcement of the telephony call for the called party.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
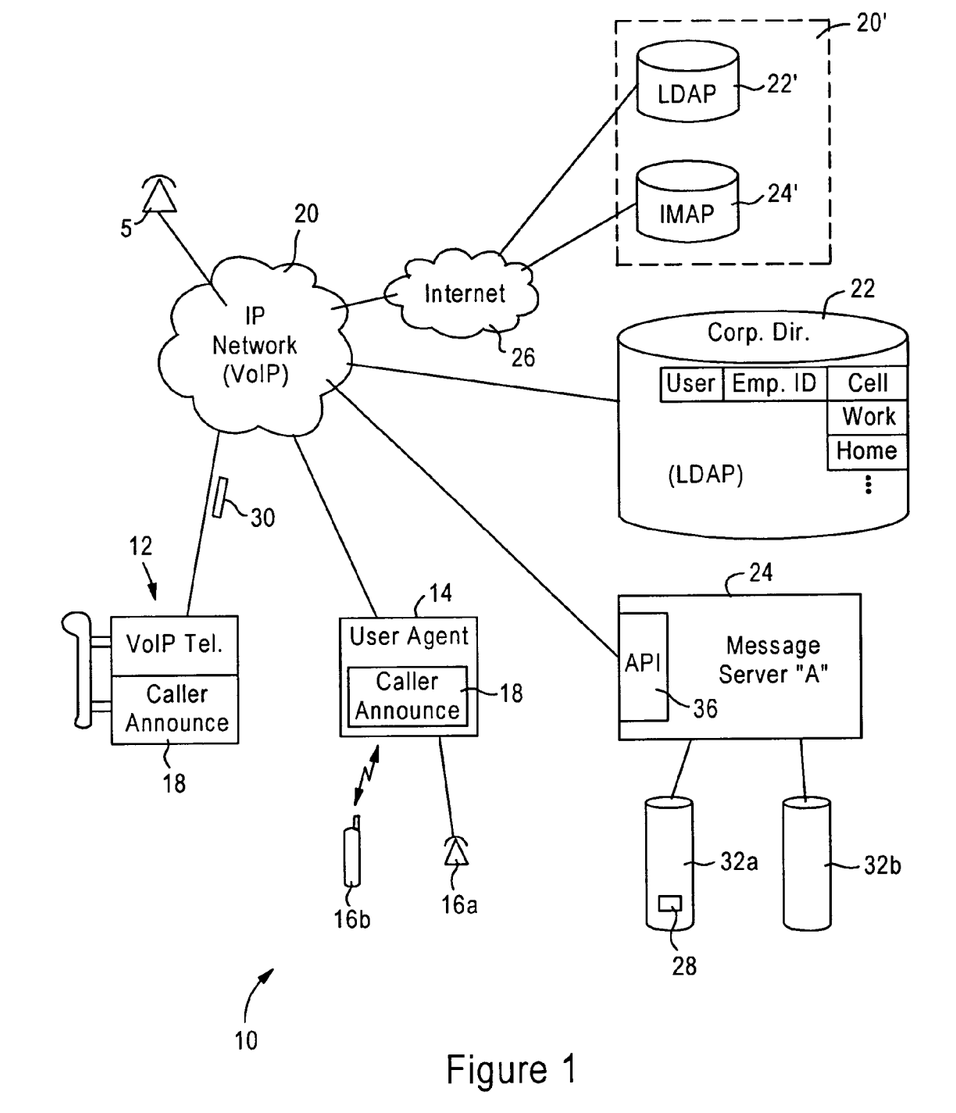
FIG. 1 is a block diagram illustrating a system for playing calling party announcements for a called party based on retrieval of a recorded audio announcement by a subscriber endpoint, according to an embodiment of the present invention.

FIG. 1 is a block diagram illustrating a system 10 for announcing a calling party 5 based on retrieval of a recorded audio announcement that audibly identifies the calling party, according to an embodiment of the present invention. The system includes a network-enabled subscriber endpoint device, for example a Voice over IP telephony device 12 or a user agent device 14. The user agent device 14 is configured for performing IP-based operations as described herein for a telephony device (e.g., an analog telephone 16a or a cellphone 16b) that lacks the IP-based resources 18 as described below with respect to FIG. 2; alternately, the user agent device 14, implemented for example within a call server, can be used to centralize processing operations and reduce processing requirements for VoIP telephony devices. The VoIP telephony device 12 and the call server 14 are configured for executing Voice over IP call processing applications according to a prescribed Voice over IP protocol, for example Media Gateway Control Protocol (MGCP) (RFC 2705), Session Initiation Protocol (SIP) (RFC 2543), H.323 protocol, etc., within the IP-based network 20. Additional details regarding implementation of the VoIP telephony device can be found in commonly-assigned, copending application Ser. No. 09/883,211, filed Jun. 19, 2001, entitled ARRANGEMENT FOR DELIVERING APPLICATIONS TO A NETWORK ENABLED TELEPHONY DEVICE, the disclosure of which is incorporated in its entirety herein by reference.

Note that the IP network 20 may include a PSTN gateway configured for terminating PSTN-based connections, for example from a PBX, into the IP based network 20, enabling subscribers of PBX based systems to utilize the features of the IP network described herein; in this case, the PSTN gateway also include the IP-based resources 18, described below.

The system 10 also includes a directory server 22, for example a corporate directory server. As described below, the directory server 22 utilizes Lightweight Directory Access Protocol (LDAP), enabling the storage of multiple attributes associated with the calling party number specified by the calling party identifier. Moreover, the use of an LDAP directory server 22 enables multiple identifiers (e.g., home telephone number, cellphone number, office telephone number, e-mail address, etc.) to be associated with the same calling party. Use of an LDAP directory server 22 also enables searching based on generating an abstract query, since the LDAP directory 22 utilizes a set of tuples associated with a record, resulting in an association of arbitrary information; consequently, the LDAP directory 22 can be used to search fields against a key, limit search queries with qualifiers, etc.

Hence, the corporate directory server 22 is configured for providing identity and services information for subscribers of the IP-based telephony network 14, including name, office address, office telephone number, cellphone number, e-mail address, and any messaging system information that may be relevant for IP-based voice messaging operations, which may be used to determine the location of the messaging subscriber's messaging mailbox. For example, assume a subscriber "John Smith" has an entry in the directory server 22 that provides the messaging attribute: "john_smith@msg_server_A.company.com" for e-mail messages; in this case, the subscriber endpoint 12 or 14 would determine the subscriber name is "john_smith", and that a messaging server 24 "msg_server_A" in the network "company.com" serves as a voice message store for the subscriber. Hence, the LDAP directory 22, configured for providing corporate telephone directory lists, email address lists, voice messaging configuration information, etc., enables a user of the subscriber endpoint device 12 or 14 to enter search queries based on name, location, reverse number search, etc. to identify the desired entry in the directory; the LDAP information can thus be used to determine the location of the messaging subscriber's messaging mailbox.

Voice messaging systems, for example the messaging server 24, typically are designed such that a subscriber must register with the messaging server by recording his or her name as a recorded audio announcement 28. This registration enables the messaging server 24 to provide a default greeting for incoming callers desiring to leave a message for the subscriber by playing the recorded audio announcement 28 identifying the subscriber, followed by playing a stored generic message that specifies, for example, ". . . is not available; at the tone, please record your message." Other messaging options typically utilized by the messaging server 24 include allowing the subscriber to record an external greeting, an internal greeting, etc.

According to the disclosed embodiment, the recorded audio announcement 28 is used by the subscriber endpoint device 12 or 14 to audibly identify a calling party, eliminating the necessity of text-to-speech conversion of the ANI string 30. In particular, the subscriber endpoint devices 12 or 14 are configured for terminating a telephone call having an ANI string 30. In response to the subscriber endpoint device 12 or 14 receiving the incoming telephony call having the calling party identifier 30 (e.g. an ANI string 30), the subscriber endpoint devices are configured to output an LDAP query to the directory server 22, that requests subscriber information that identifies the calling party. The LDAP directory 22 supplies the calling party's subscriber information, based on performing a search using the calling party identifier 30 as a key. Note that the LDAP directory 22 may associate the same subscriber profile information with multiple telephone numbers (e.g., cellphone number, office telephone number, home telephone number, temporary telephone number, etc.).

The subscriber endpoint devices 12 or 14 receive from the LDAP directory 22 a record that corresponds to the calling party associated with the calling party identifier 30: the record may include, for example, first name, last name, employee identification number, office phone number (which may differ from the number specified in the ANI string 30), office address, organization, etc. Based on the record received from the LDAP directory 22, the subscriber endpoint devices 12 or 14 are configured for determining the location of the recorded audio announcement from the response generated by the LDAP directory 22. For example, the subscriber endpoint devices 12 or 14 may be configured with prescribed locator information for identifying a messaging server 24 that stores the recorded audio announcement 28, enabling the subscriber endpoint devices 12 or 14 to request the recorded audio announcement 28 from the identified messaging server 24 upon receiving the subscriber name from the LDAP response; alternatively the subscriber endpoint devices 12 or 14 may determine the locator information using a prescribed discovery protocol, for example DNS query procedures. Typically, however, the subscriber endpoint devices 12 or 14 already will have information identifying the voice messaging server 24, enabling the retrieval of the recorded audio announcement 28 once the subscriber name (and office address if multiple servers 24 are used for different geographic areas) has been retrieved from the LDAP directory 22.

Alternately the LDAP response may be a redirect request that redirects the subscriber endpoint devices to another corporate LDAP directory 22' of another corporate network 20', accessible via the Internet 26. For example, the owners of the first directory network 20 and the second network 20' may have a business partner agreement to share employee contact information. In this case, the subscriber endpoint devices 12 or 14 would query the remote LDAP directory 22' for the calling party information (including, e.g., calling name and office address) to enable retrieval of the audible announcement.

Once the subscriber endpoint devices 12 or 14 have obtained the subscriber information as registered in the LDAP directory 22, the subscriber endpoint devices 12 or 14 retrieve the recorded audio announcement 28 based on sending a request to the messaging server 24 (or 24' in the case of remote access) that specifies the subscriber information. As illustrated in FIG. 1, the messaging server 24 is configured as a server having tangible medium (e.g., high-density disks) 32a and 32b for storing user profile information including the recorded audio announcement 28, and stored messages for subscribers, respectively; in this case, the subscriber endpoint devices 12 or 14 may generate a command according to a prescribed application programming interface (API) 36 executable by the messaging server 24. In contrast, the messaging server 24 may be accessible as a tangible medium having its own IP address and a directory structure for storing the subscriber messages and announcements (e.g., an IMAP directory); in this case, the subscriber endpoint devices 12 or 14 retrieve the recorded audio announcement by generating a string that specifies an identity of the recorded audio announcement at the corresponding stored location on the tangible medium.

Hence, the subscriber endpoint devices 12 or 14 will retrieve the recorded audio announcement either using a prescribed API command, or if direct addressing of the recorded audio announcement is available (e.g., FTP transfer or an IMAP server), the subscriber endpoint devices 12 or 14 will generate a request that includes a directory path that specifies the stored location.

Figure 2:
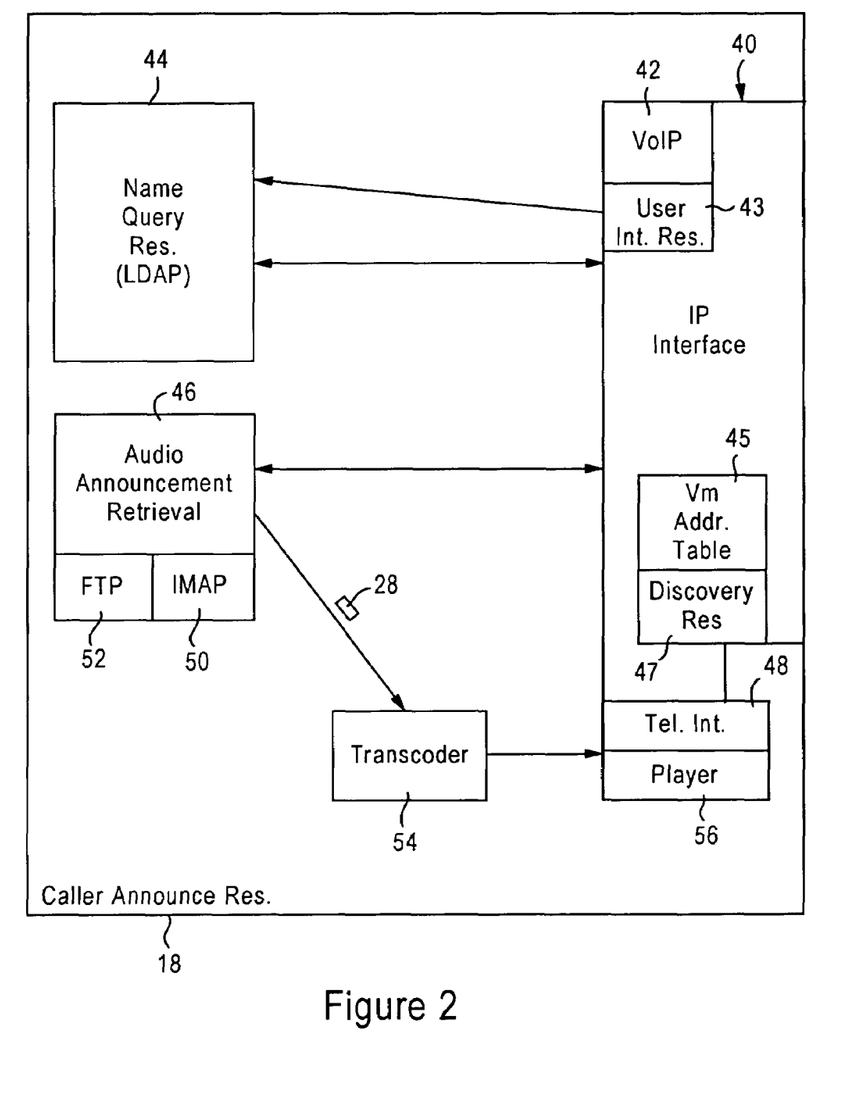
FIG. 2 is a diagram illustrating in detail the executable resources within the subscriber endpoint used to retrieve the recorded audio announcement.

FIG. 2 is a diagram illustrating the IP-based resource 18 executable within the subscriber endpoint devices 12 or 14 enabling automatic audio caller identification, according to an embodiment of the present invention. As illustrated in FIG. 2, the subscriber endpoint devices 12 or 14 each include an IP based interface 40 configured for sending and receiving IP based messages according to various IP based protocols. For example, the IP based interface 40 includes a Voice over IP resource 42 configured for sending and receiving messages according to a prescribed voice over IP protocol, for example SIP, MGCP, or H.323. Hence, the Voice over IP resource 42 is configured for receiving a telephony call for a called party and which includes a calling party identifier 30 that identifies the calling party.

The Voice over IP resource 42 also has an associated a user interface resource 43 configured for controlling the controlling the user interface of the telephony device, including ringing the telephone, displaying data on a user display, processing input keys pressed by the user. As described below, the user interface resource 43 is configured for passing LDAP queries for retrieval of subscriber information to identify a calling party.

The subscriber endpoint devices 12 or 14 also include a name query resource 44 configured for generating and outputting an IP based query, that includes the calling party identifier 30, to the LDAP directory 22 for retrieval of the subscriber profile information enabling the retrieval of the recorded audio announcement 28. As illustrated in FIG. 2, the name query resource 44 is configured for outputting the query, having the calling party identifier 30, to the LDAP directory 20 according to LDAP protocol. If the name query resource 44 receives a redirect response from the LDAP directory 22, the name query resource 44 outputs the LDAP query to the remote LDAP directory 22' specified in the redirect response (e.g., by including the IP address of the remote LDAP directory 22' specified in the redirect response).

The subscriber endpoint devices 12 or 14 also include an audio announcement retrieval resource 46, also referred to as a file transfer resource, configured for retrieving the recorded audio announcement 28 using the subscriber information retrieved by the LDAP query resource 44. In particular, the audio announcement retrieval resource 46 is configured for retrieving via an IP connection the recorded audio announcement 28 using locator information, identified by the IP interface 40, that identifies the voice messaging system 24 storing the recorded audio identifier 28. In particular, the IP interface 40 includes an address table 45 that stores prescribed locator information, for example cached or predetermined IP addresses (or host names) for known messaging servers 24 that are associated with the Voice over IP network 20. The IP interface 40 also includes a discovery resource 47, configured for locating unknown messaging servers (e.g., the IMAP message store 24') using prescribed discovery protocols, for example DNS query procedures.

The file transfer resource 46 retrieves the recorded audio announcement 28 according to the protocol used by the message store 24. If a messaging server utilizes a prescribed API 36, the file transfer resource 46 generates the prescribed API command and supplies the calling party name supplied by the LDAP directory 22; if the recorded audio announcement is stored via a directory path that specifies the corresponding stored location for an IMAP directory or a hard disk, the file transfer resource utilizes an IMAP resource 50 or an FTP utility 52 to generate a string having the directory path and the identity of the recorded audio announcement, enabling retrieval of the recorded audio announcement 28 from the IMAP message store or the tangible medium (e.g., the message store 24'), respectively.

Once the file transfer resource 46 has retrieved the recorded audio announcement 28 from the message store (e.g., 32a or 24'), the recorded audio announcement 28 is transcoded by a transcoding resource 54 into a format compatible for a player resource, if necessary. For example, the transcoding resource 54 may convert a .wav or MP3 file to G.711 or G.729 format. If the recorded audio announcement 28 needs to be played locally, for example by the telephony device 12 or a user agent 14 serving an analog telephony device 16a, the recorded audio announcement 28 is supplied to a player resource 56; alternately, the user agent 14 also will include a telephony player interface 48 that sends the recorded audio announcement 28 to the destination telephony device (e.g., the digital wireless telephone 16b) according to corresponding device transport protocol (e.g., TDMA, CDMA, etc.).

Figure 3:
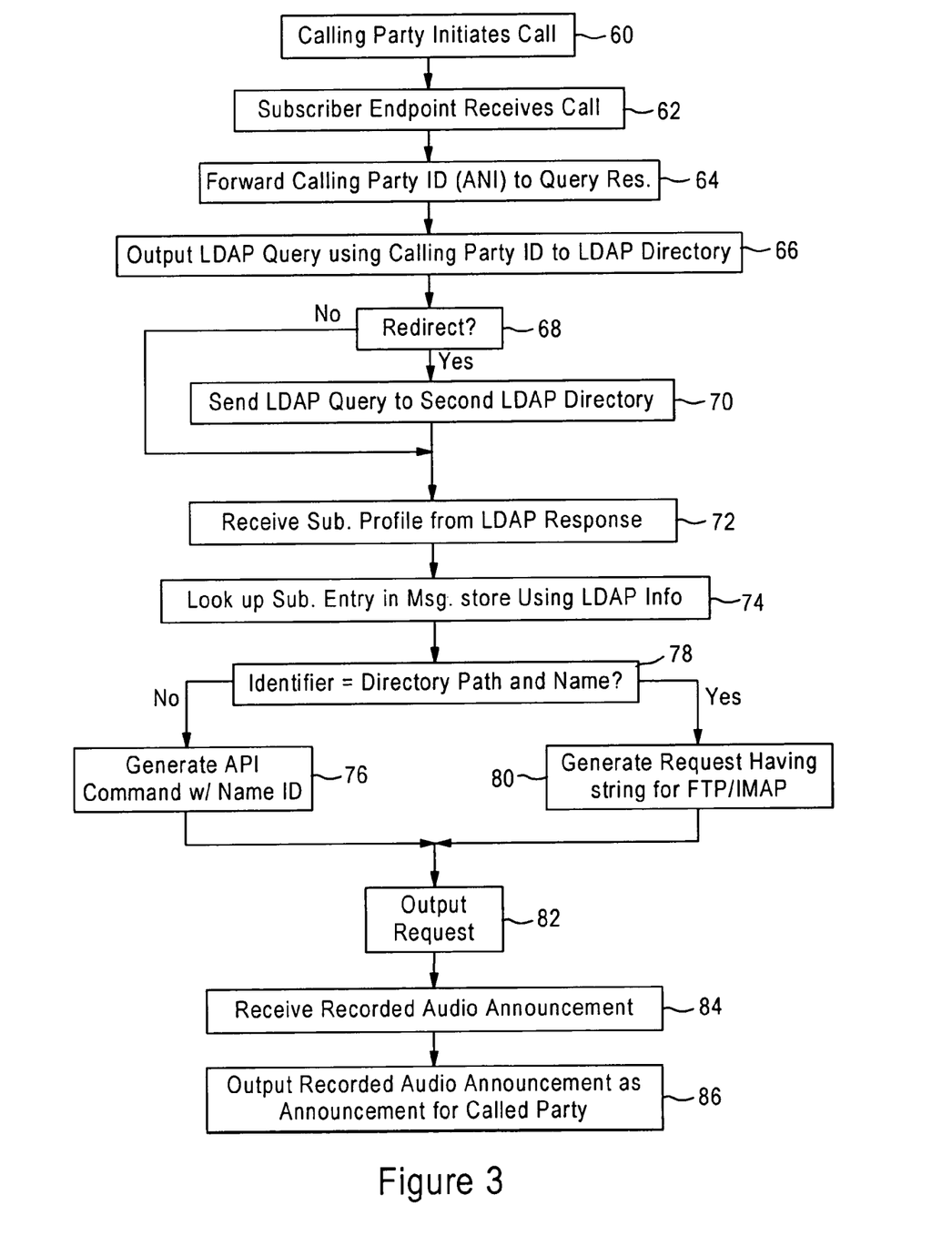
FIG. 3 is a diagram illustrating the method of announcing a calling party based on retrieval of a recorded audio announcement that audibly identifies the calling party, according to an embodiment of the present invention.

FIG. 3 is a diagram illustrating the method of providing automatic audio caller identification based on retrieving a recorded audio announcement, according to an embodiment of the present invention. The steps described in FIG. 3 can be implemented as executable code stored on a computer readable medium (e.g., a hard disk drive, a floppy drive, a random access memory, a read only memory, an EPROM, a compact disc, etc.).

The method begins in step 60, where a calling party 5 initiates a telephone call to a called party via the IP network, for example as a voice over IP telephone call. Prior to placing the telephone call, it is assumed that the calling party 5 has already registered as a subscriber with the LDAP directory 22, and previously recorded his or her recorded audio announcement 28 that audibly identifies the subscriber, for example for voice messaging operations.

The telephone call is routed using existing routing protocols, and the subscriber endpoint 12 or 14 receives in step 62 the telephony call for the called party and which includes the calling party identifier 30. In particular, the voice over IP resource 42 of FIG. 2 receives the incoming call in step 62, and the user interface resource 43 forwards the calling party identifier 28 to the name query resource 44 in step 64.

The name query resource 44 generates and outputs in step 66 an LDAP query that includes the calling party identifier, to the LDAP directory server 22 registered with the name query resource 44. If in step 68 the name query resource 44 receives a redirect response that specifies a second directory server 22' based on its corresponding IP address, the name query resource 44 sends the LDAP query, including the calling party identifier, to the second directory server 22' in step 70. The redirect query process may be repeated until a prescribed number of redirect attempts been made, or a timeout has occurred.

Assuming the LDAP directory having received the query is able to process the query, the name query resource 44 receives in step 72 the subscriber profile information for the calling party (e.g., name, office telephone number, employee identifier number, etc.,) that identifies calling party and enables the caller announcement resource 18 to locate the stored location of the recorded audio announcement 28 that audibly identifies the calling party. The IP interface 40, using the address table 45 or the discovery resource 47, determines in step 74 the stored location of the recorded audio announcement 28 from the messaging server 24 by looking up the subscriber entry (e.g., based on subscriber name, employee identification, etc.) using the LDAP information. If the IP interface 40 determines that a server-based retrieval is needed, the audio announcement retrieval resource 46 generates in step 76 a request that specifies an identifier recognizable by the server 24 (e.g., username) and including the necessary API command, if necessary. Alternatively, if the IP interface 40 determines in step 78 that an FTP based transfer is to be performed, the audio announcement retrieval resource 46 generates in step 80 a string that specifies an identity of the recorded audio announcement at the stored location in the form of a filename with a directory path. The request is output to the destination store in the recorded audio announcement 28 in step 82.

In response to receiving the recorded audio announcement 28 in step 84, the subscriber endpoint 12 or 14 outputs in step 86 the recorded audio caller announcement as an announcement of the telephony call for the called party. As described above, the outputting of the recorded audio caller announcement in step 86 may include transcoding the recorded audio caller announcement 28 by the transcoder 54 to a native format announcement executable by the player 56, prior to playing the transcoded file by the player 56. Alternately, the transcoded file, in the case of the proxy device 14 may be supplied to the telephony device 16a and according to a prescribed interface protocol by the telephone/player interface 48.

According to the disclosed embodiment, calling parties can be automatically identified based on retrieving a recorded audio announcement that audibly identifies the calling party from existing voice messaging systems to which the calling party is registered. Hence, audible announcement of a calling party can be implemented, in the calling party's own voice, without the necessity of text-to-speech processing for received ANI strings. Moreover, the use of recorded audio announcement generated by voice messaging systems during registration of the subscriber provides a degree of security and reliability, since the same recorded audio announcement 28 is used to identify the subscriber for voice messaging operations, minimizing the possibility of abuse by anonymous callers. Further, use of LDAP-based queries enables multiple telephone numbers that may be used by a calling party to be mapped to the same audible identifier (e.g., retrieving a subscriber's corporate voicemail identifier based on the subscriber calling from his or her cellphone). Finally, the use of IP based queries enables the sharing of subscriber information across distributed voice over IP based messaging networks, enabling wide scale deployment between business partners.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended

What is claimed is:

1. A method in an Internet Protocol (IP) based subscriber endpoint configured for receiving a telephony call for a called party and that includes a calling party identifier for identifying a corresponding calling party, the method including:
    outputting an IP-based query, that includes the calling party identifier, to a directory server for subscriber information that identifies the calling party;
    determining a stored location of a recorded audio announcement that audibly identifies the calling party based on the subscriber information;
    retrieving via an IP connection the recorded audio announcement from the stored location; and
    outputting the recorded audio announcement as an announcement of the telephony call for the called party.

2. The method of claim 1, wherein the IP-based query outputting step includes outputting the IP-based query, having the calling party identifier, to the directory server according to Lightweight Directory Access Protocol (LDAP).

3. The method of claim 2, wherein the determining step includes:
    determining an IP address for a server configured for storing the recorded audio announcement, and an identifier recognizable by the server for retrieval of the recorded audio announcement;
    sending a request, specifying the identifier, to the server at the corresponding IP address for the recorded audio announcement, according to a protocol executable by tide server; and
    receiving the recorded audio announcement from the server.

4. The method of claim 3, wherein the sending step includes generating a prescribed command according to an Application Programming Interface (API) utilized by the server.

5. The method of claim 3, wherein the sending step includes specifying a calling party name as the identifier, the server being a subscriber directory.

6. The method of claim 2, wherein the determining step includes:
    determining an IP address for a remote tangible medium configured for storing the recorded audio announcement, and a directory path that specifies the corresponding stored location;
    generating a string that specifies an identity of the recorded audio announcement at the stored location on the remote tangible medium; and
    outputting a request, that includes the IP address and the string, for retrieval of the recorded audio announcement from the remote tangible medium.

7. The method of claim 2, further comprising:
    receiving from the directory server a redirect response that specifies a second directory server for retrieval of the subscriber information;
    sending the IP-based query, that includes the calling party identifier, to the second directory server based on the redirect response; and
    receiving the subscriber information from the second directory server.

8. The method of claim 7, wherein:
    the receiving the subscriber information includes receiving the subscriber information via a wide area, packet switched IP-based network; and
    the retrieving step includes retrieving the recorded audio announcement via the wide area, packet switched IP-based network.

9. The method of claim 2, wherein the subscriber endpoint is an IP telephony device, the outputting step including:
    transcoding the recorded audio announcement to a native format announcement executable by a player within the IP telephony device, and
    playing the native format announcement for the called party by the player.

10. The method of claim 2, wherein the subscriber endpoint is a proxy device in communication with a telephony device for the called party, the outputting step including:
    transcoding the recorded audio announcement to a native format data stream executable by the telephony device; and
    supplying the native format data stream to the telephony device according to a prescribed interface protocol used between the proxy device and the telephony device.

11. An Internet Protocol (IP) based subscriber endpoint device comprising:
    an IP based interface configured for receiving a telephony call for a called party and that includes a calling party identifier for identifying a corresponding calling party;
    a query resource configured for outputting an IP-based query, that includes the calling party identifier, to a directory server for subscriber information that identifies a calling party;
    a file transfer resource configured for retrieving via an IP connection a recorded audio announcement, that audibly identifies the calling party, from a stored location determined based on the subscriber information; and
    an output resource configured for outputting the recorded audio, announcement as an announcement of the telephony call for the called party.

12. The device of claim 11, wherein the query resource is configured for outputting the IP-based query, having the calling party identifier, to the directory server according to Lightweight Directory Access Protocol (LDAP).

13. The device of claim 12, wherein:
the IP based interface is configured for determining a server configured for storing the recorded audio announcement; and
the file transfer resource is configured for sending to the server a request, specifying at least a portion of the subscriber information, for the recorded audio announcement, according to a protocol executable by the server, and receiving the recorded audio announcement from the server.

14. The device of claim 13, wherein the file transfer resource is configured for sending the request by generating a prescribed command according to an Application Programming Interface (API) utilized by the server.

15. The device of claim 13, wherein the file transfer resource is configured for specifying a calling party name as the identifier, the server being a subscriber directory.

16. The device of claim 12, wherein:
the IP based interface is configured for determining a remote tangible medium configured for storing the recorded audio announcement; and
the file transfer resource is configured for generating a string that specifies an identity of the recorded audio announcement at the stored location on the remote tangible medium, and outputting to the remote tangible medium a request, that includes the string, for retrieval of the recorded audio announcement from the remote tangible medium.

17. The device of claim 12, wherein the query resource, in response to receiving from the directory server a redirect response that specifies a second directory server for retrieval of a locator, sends the IP-based query, that includes the calling party identifier, to the second directory server based on the redirect response, for reception of the locator from the second directory server.

18. The device of claim 17, wherein the query resource and the file transfer resource are configured for receiving the locator and the recorded audio announcement, respectively, via a wide area, packet switched IP-based network.

19. The device of claim 12, further comprising a player configured for playing an audio file according to a native format, the subscriber endpoint being implemented in an IP telephony device and the output resource configured for transcoding the recorded audio announcement to a native format announcement executable by the player within the IP telephony device.

20. The device of claim 12, wherein the subscriber endpoint is a proxy device in communication with a telephony device for the called party, the output resource configured for:
transcoding the recorded audio announcement to a native format data stream executable by the telephony device; and
supplying the native format data stream to the telephony device according to a prescribed interface protocol used between the proxy device and the telephony device.

21. A computer readable medium having stored thereon sequences of instructions for receiving an IP based telephony call for a called party and that includes a calling party identifier for identifying a corresponding calling party, the sequences of instructions including instructions for performing the steps of:
outputting an IP-based query, that includes the calling party identifier, to a directory server for subscriber information that identifies the calling party;
determining a stored location of a recorded audio announcement that audibly identifies the calling party based on the subscriber information;
retrieving via an IP connection the recorded audio announcement from the stored location; and
outputting the recorded audio announcement as an announcement of the telephony call for the called party.

22. The medium of claim 21, wherein the IP-based query outputting step includes outputting the IP-based query, having the calling party identifier, to the directory server according to Lightweight Directory Access Protocol (LDAP).

23. The medium of claim 22, wherein the determining step includes:
determining an IP address for a server configured for storing the recorded audio announcement, and an identifier recognizable by the server for retrieval of the recorded audio announcement;
sending a request, specifying the identifier, to the server at the corresponding IP address for the recorded audio announcement, according to a protocol executable by the server; and
receiving the recorded audio announcement from the server.

24. The medium of claim 23, wherein the sending step includes generating a prescribed command according to an Application Programming Interface (API) utilized by the server.

25. The medium of claim 23, wherein the sending step includes specifying a calling party name as the identifier, the server being a subscriber directory.

26. The medium of claim 22, wherein the determining step includes:
determining an IP address for a remote tangible medium configured for storing the recorded audio announcement, and a directory path that specifies the corresponding stored location;
generating a string that specifies an identity of the recorded audio announcement at the stored location on the remote tangible medium; and
outputting a request, that includes the IP address and the string, for retrieval of the recorded audio announcement from the remote tangible medium.

27. The medium of claim 22, further comprising instructions for performing the steps of:
receiving from the directory server a redirect response that specifies a second directory server for retrieval of the subscriber information;
sending the IP-based query, that includes the calling party identifier, to the second directory server based on the redirect response; and
receiving the subscriber information from the second directory server.

28. The medium of claim 27, wherein:
the receiving the subscriber information includes receiving the subscriber information via a wide area, packet switched IP-based network; and
the retrieving step includes retrieving the recorded audio announcement via the wide area, packet switched IP-based network.

29. The medium of claim 22, wherein the subscriber endpoint is an IP telephony device, the outputting step including:
transcoding the recorded audio announcement to a native format announcement executable by a player within the IP telephony device, and
playing the native format announcement for the called party by the player.

30. The medium of claim 22, wherein the subscriber endpoint is a proxy device in communication with a telephony device for the called party, the outputting step including:
 transcoding the recorded audio announcement to a native format data stream executable by the telephony device; and
 supplying the native format data stream to the telephony device according to a prescribed interface protocol used between the proxy device and the telephony device.

31. An Internet Protocol (IP) based subscriber endpoint device comprising:
 means for outputting an IP-based query, that includes the calling party identifier, to a directory server for subscriber information that identifies the calling party;
 means for determining a stored location of a recorded audio announcement that audibly identifies the calling party based on the subscriber information;
 means for retrieving via an IP connection the recorded audio announcement from the stored location; and
 means for outputting the recorded audio announcement as an announcement of the telephony call for the called party.

32. The device of claim 31, wherein the IP-based query outputting means is configured for outputting the IP-based query, having the calling party identifier, to the directory server according to Lightweight Directory Access Protocol (LDAP).

33. The device of claim 32, wherein the determining means is configured for determining an IP address for a server configured for storing the recorded audio announcement, and an identifier recognizable by the server for retrieval of the recorded audio announcement, the retrieving means configured for sending a request, specifying the identifier, to the server at the corresponding IP address for the recorded audio announcement, according to a protocol executable by the server, the retrieving means configured for receiving the recorded audio announcement from the server.

34. The device of claim 33, wherein the retrieving means is configured for generating a prescribed command according to an Application Programming Interface (API) utilized by the server.

35. The device of claim 33, wherein the retrieving means is configured for specifying a calling party name as the identifier, the server being a subscriber directory.

36. The device of claim 32, wherein:
 the determining means is configured for determining an IP address for a remote tangible medium configured for storing the recorded audio announcement, and a directory path that specifies the corresponding stored location;
 the retrieving means configured for generating a string that specifies an identity of the recorded audio announcement at the stored location on the remote tangible medium, and outputting a request, that includes the IP address and the string, for retrieval of the recorded audio announcement from the remote tangible medium.

37. The device of claim 32, wherein the IP-based query outputting means is configured for:
 receiving from the directory server a redirect response that specifies a second directory server for retrieval of the subscriber information;
 sending the IP-based query, that includes the calling party identifier, to the second directory server based on the redirect response; and
 receiving the subscriber information from the second directory server.

38. The device of claim 37, wherein:
 the IP-based query outputting means is configured for receiving the subscriber information via a wide area, packet switched IP-based network; and
 the retrieving means is configured for retrieving the recorded audio announcement via the wide area, packet switched IP-based network.

39. The device of claim 32, wherein the subscriber endpoint is an IP telephony device, the outputting means configured for transcoding the recorded audio announcement to a native format announcement executable by a player within the IP telephony device, playing the native format announcement for the called party by the player.

40. The device of claim 32, wherein the subscriber endpoint is a proxy device in communication with a telephony device for the called party, the outputting step means configured for transcoding the recorded audio announcement to a native format data stream executable by the telephony device, supplying the native format data stream to the telephony device according to a prescribed interface protocol used between the proxy device and the telephony device.

* * * * *

UNITED STATES PATENT AND TRADEMARK OFFICE
CERTIFICATE OF CORRECTION

PATENT NO. : 6,940,954 B1
DATED : September 6, 2005
INVENTOR(S) : Toebes

It is certified that error appears in the above-identified patent and that said Letters Patent is hereby corrected as shown below:

Column 10,
Line 62, please delete the comma after the word "audio".

Signed and Sealed this

Eighth Day of November, 2005

JON W. DUDAS
*Director of the United States Patent and Trademark Office*